United States Patent Office 3,123,481
Patented Mar. 3, 1964

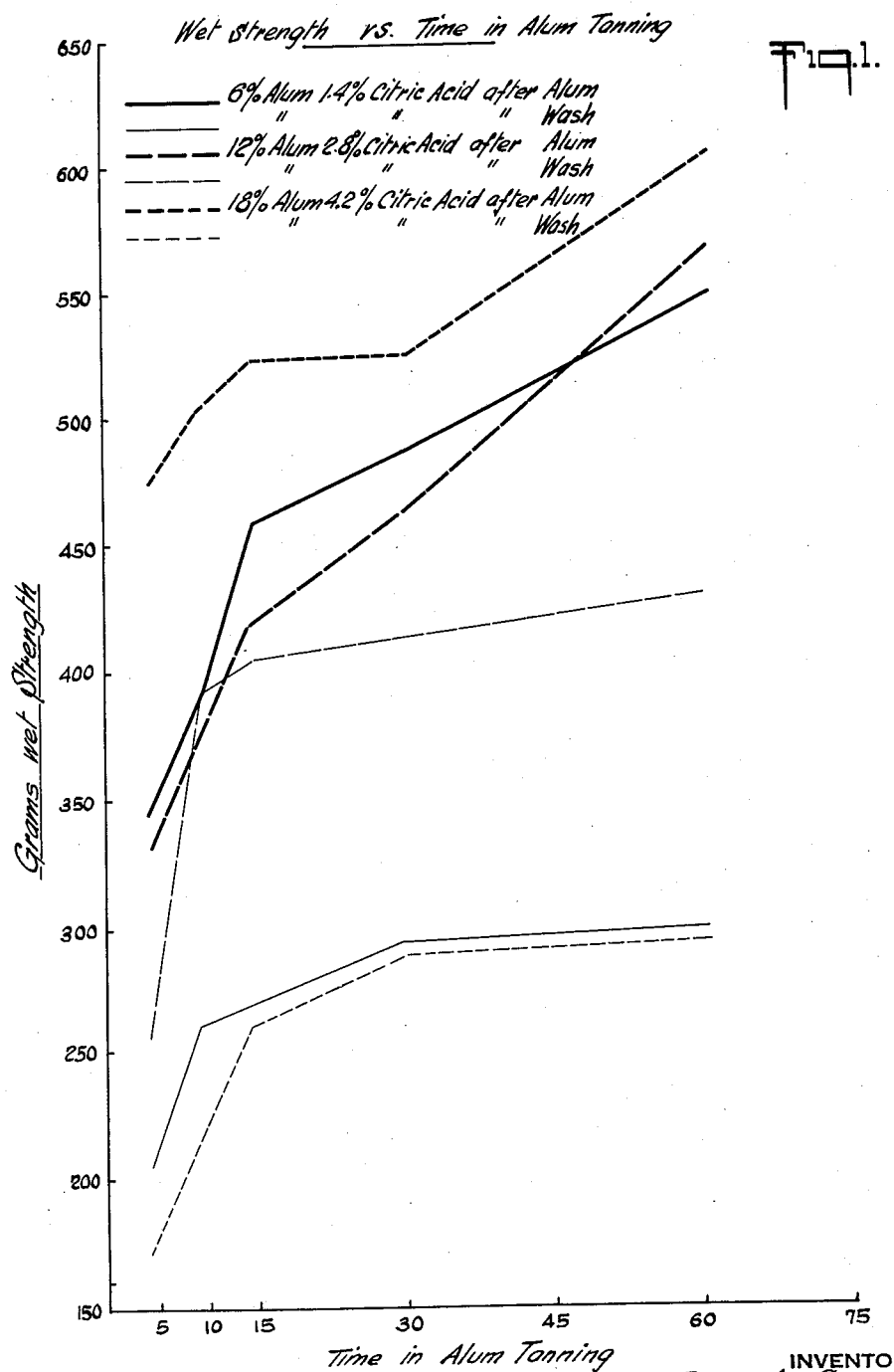

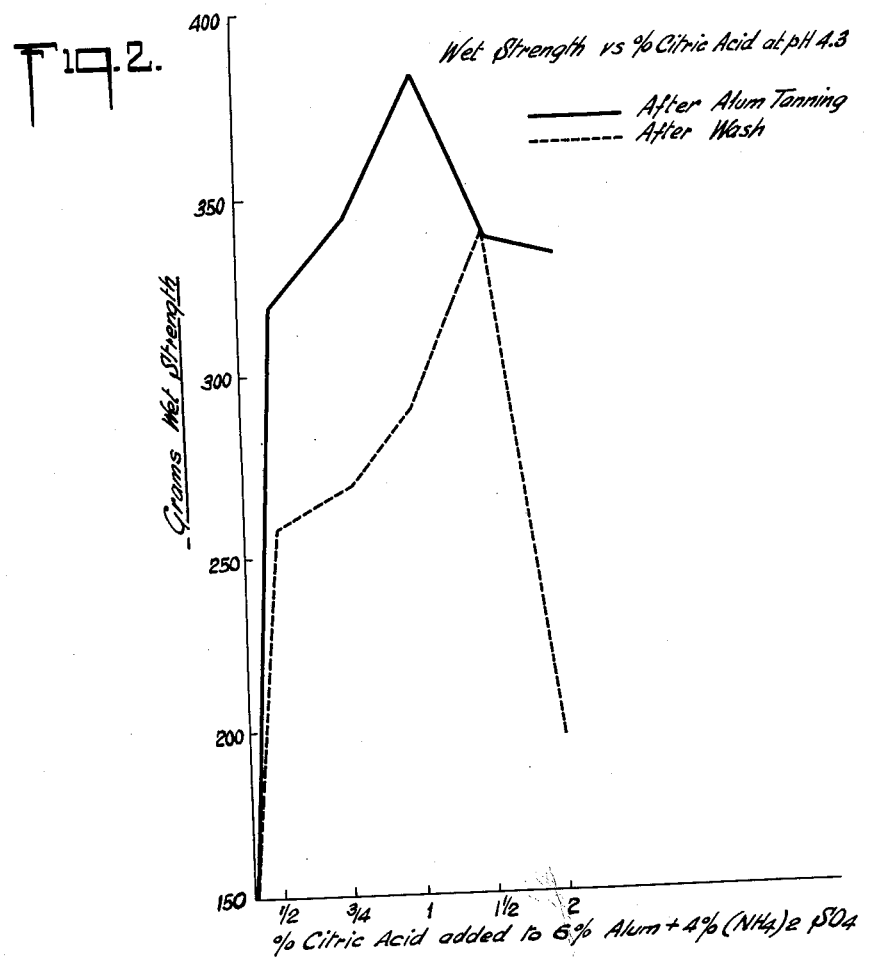
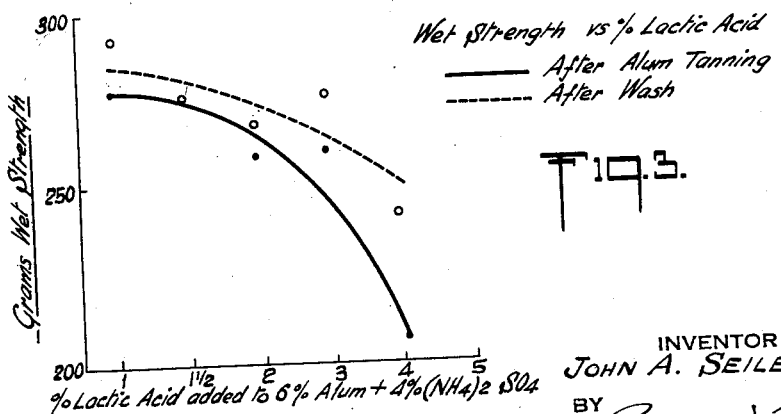

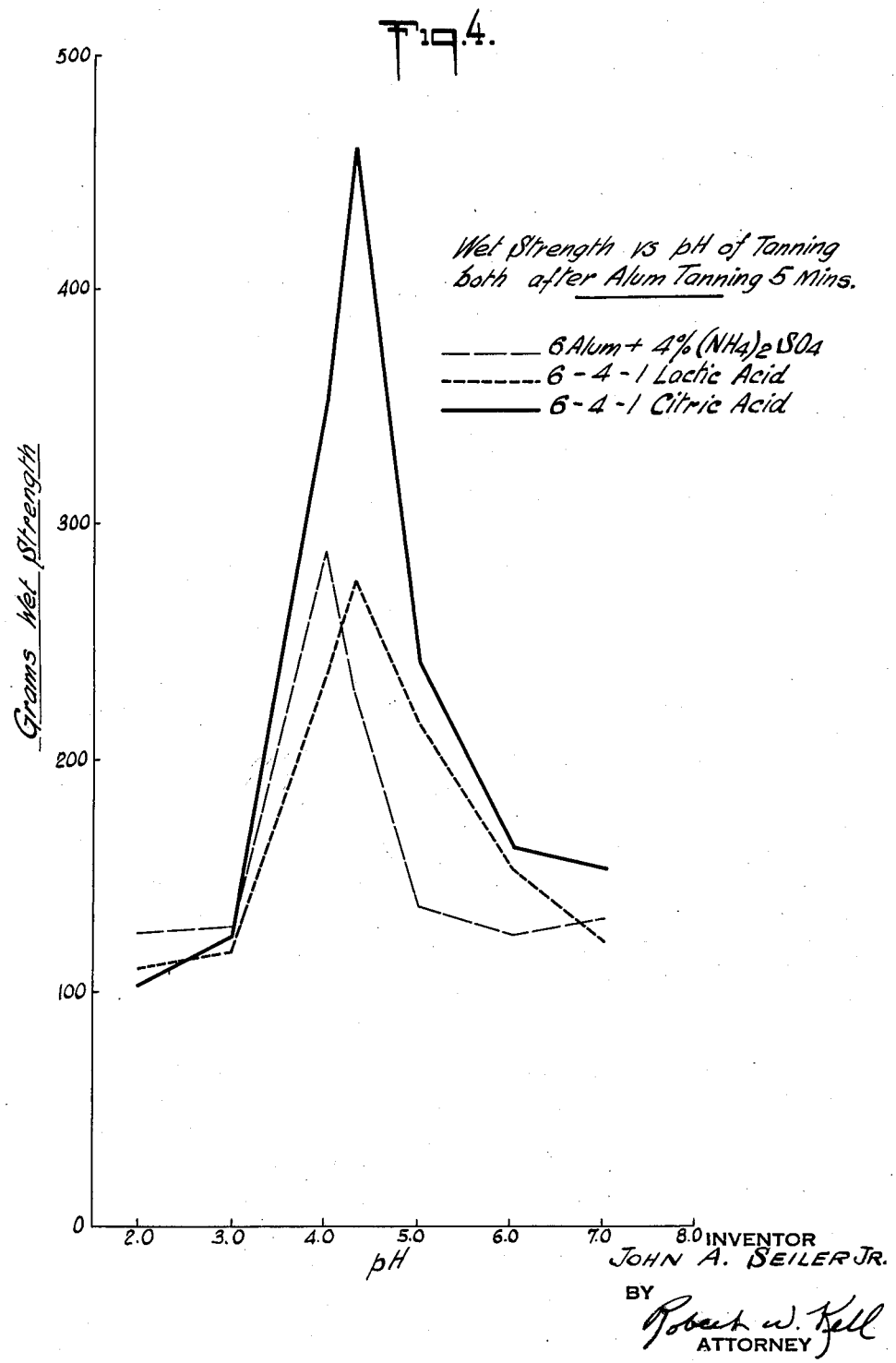

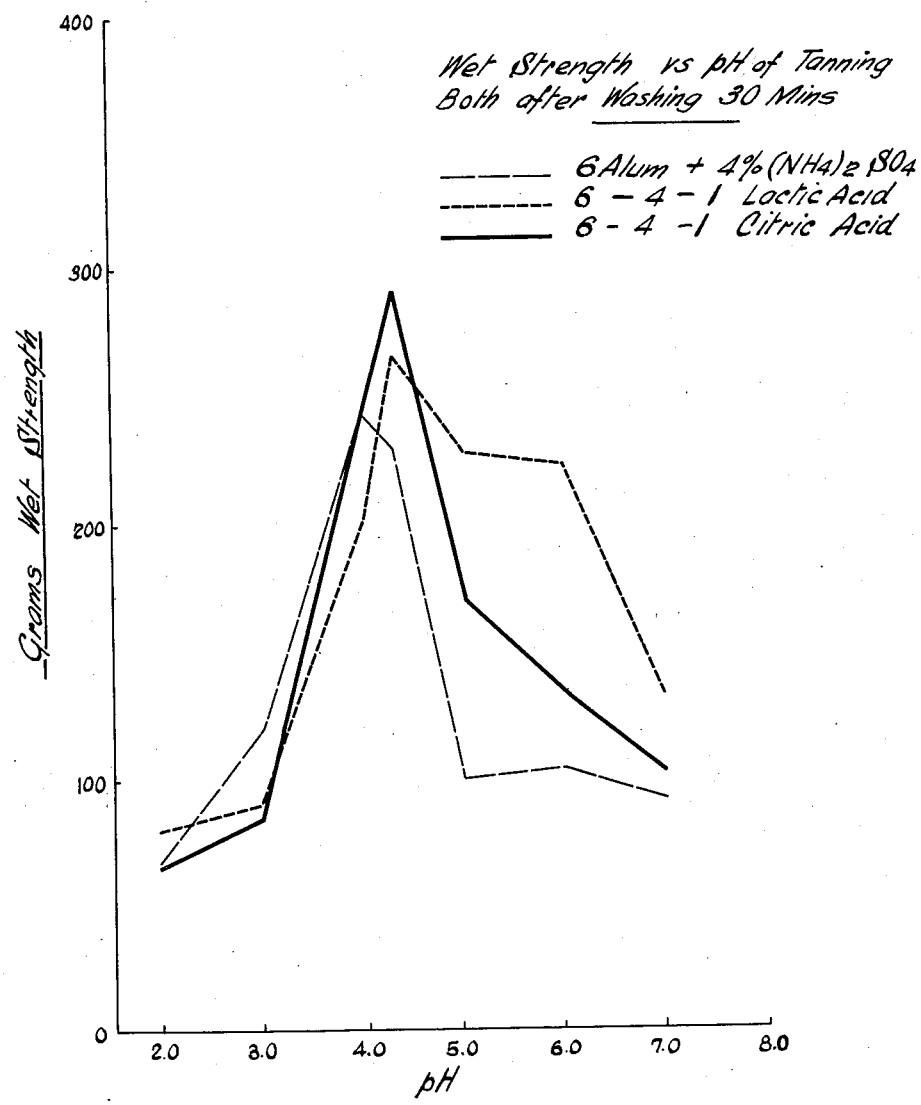

3,123,481
TANNED EDIBLE COLLAGEN CASING AND METHOD OF PRODUCING SAME
John A. Seiler, Jr., Franklin Township, Somerset County, N.J., assignor to Johnson & Johnson, a corporation of New Jersey
Filed Oct. 24, 1960, Ser. No. 64,664
12 Claims. (Cl. 99—176)

This invention relates to an improved tanned collagen article and to a method of tanning collagen with alum.

For the sake of clarity and brevity, certain terms used in the specification and claims are defined as follows:

"Wet strength" is the stress in pounds that is required to break a section cut from an extruded collagen tube and immersed in distilled water for one minute, the stress being applied in a lengthwise direction parallel to the longitudinal axis of the extruded tube. The section tested measures ½ inch in width and 1 mil in thickness.

"Burst strength" is the air pressure in pounds per square inch to burst dry extruded collagen casing having a wall thickness of 1 mil. The values of "burst strength" expressed in this specification were determined on a Perkins Mullen Tester (Model C). Fluid under uniformly increasing pressure expands against a distensible rubber diaphragm and, simultaneously, into a Bourdon pressure gauge. The material to be tested is clamped securely to a metal plate through which the diaphragm is free to expand through a circular opening against one square inch of its surface. As the sample distorts under pressure, the diaphragm assumes the exact contour of the material, uniformly distributes the pressure over the entire test area, and protrudes into any imperfection or weak section to burst or rupture it at that point. When the pressure drops at the moment of rupture, a maximum hand on the gauge remains stationary to indicate the exact pressure at the time the bursting occurred.

"Shrink tension" is the tension in pounds that is developed by a dry extruded collagen casing 1½ inches in length maintained at constant length while heated in an oil bath to 100–150° C.

"Hot tensile strength" is the stress in pounds that is required to break a section cut from an extruded collagen tube, the stress being applied in a lengthwise direction parallel to the longitudinal axis of the extruded tube. The section tested measures ½ inch in width and 1 mil in thickness, and is heated to 100° C. with steam at the time of testing.

The product of the invention is particularly adapted to be utilized as an edible casing for fresh pork sausages which must be cooked by the consumer, and sausages of the wiener or frankfurter type. The latter sausages are generally processed by being smoked and cooked by the packer and are generally reheated before they are consumed. When such sausages are provided with edible casings, it is unnecessary to remove the casing before the sausage is eaten.

Natural casings, i.e., those prepared from the intestines of animals such as cattle, swine and sheep, suffer from a number of disadvantages which limit their acceptance. While sheep casings command a high price because of the fact that they are exceptionally tender and may be readily eaten with the sausage, cleaned intestines, in spite of processing, are frequently tough and unpleasant to eat. In addition, the thickness of the wall and diameter of natural casings will vary, causing difficulty during modern high speed stuffing.

In view of the obvious deficiencies of natural casings and the expense of preparing such casings for human consumption, it is not surprising that many attempts have been made to prepare a better edible casing from other sources of collagen.

It has already been proposed to produce an artificial collagen casing from fibrous animal material such as, for example, hide. Collagen in such fibrous material is converted by mechanical disintegration and the swelling action of acids into a plastic mass which is then extruded to form a tube. It has been found necessary, in order to obtain the mechanical strength required of the extruded casing in use, to include a tanning step in the manufacturing process. Various tanning agents, such as formaldehyde, have been employed for this purpose but such tanning, in addition to improving the tensile strength of the casing, has had the undesirable effect of increasing the shrinkage tension and decreasing the flexibility. Such casing, when stuffed with edible meat, will not survive in the frying pan because cooking temperatures cause the collagen casing to shrink, extruding the meat product. It is another disadvantage of the highly tanned casing of the prior art that they are tough and difficult to masticate.

It has now been discovered that when the collagen casing is tanned with alum under certain conditions to be defined below, the collagen is tanned sufficiently to provide the required strength characteristics without appreciably increasing the shrinkage tension and toughness of the end product.

It is an object of the present invention to produce a new and improved alum-tanned collagen casing that, when filled with an edible meat product, will survive without breaking or undue shrinkage.

It is a further object of this invention to produce a continuous extruded alum-tanned collagen tube.

It is also an object of this invention to produce a new and improved collagen casing having characteristics superior to casings of the prior art.

The foregoing and other objects may be attained in accordance with the present invention, which in its various aspects proivdes or embraces (1) an extruded collagen tube as a new and improved article of manufacture and (2) a novel method or process suitable for manufacture of such products. Both aspects of my invention will become apparent from the following detailed description and from an inspection of the accompanying drawings in which:

FIGURE 1 is a graph illustrating the change in the wet strength of a collagen casing with the time in the tanning bath.

FIGURE 2 is a graph illustrating the change in the wet strength of a collagen casing with the percent citric acid in the tanning bath.

FIGURE 3 is a graph illustrating the change in the wet strength of a collagen casing with the percent lactic acid in the tanning bath.

FIGURE 4 is a graph illustrating the change in the wet strength after alum tanning of a collagen casing with the pH of the tanning bath.

FIGURE 5 is a graph illustrating the change in the wet strength after washing of a collagen casing with the pH of the tanning bath.

Considering the invention firstly as a novel product, I have provided a seamless extruded tanned collagenous tube containing about 0.3 to 1.1% by weight aluminum (about 5 to 20% by weight alum calculated on $NH_4Al(SO_4)_2 \cdot 24H_2O$). The products of the present invention have a burst strength of at least about 10 pounds per square inch, a shrink tension of about 0.1 to about 0.3 and a hot tensile strength of about 0.15 to about 0.50. This product is entirely suitable as a sausage casing because it may be shirred, stuffed and linked on modern high-speed machinery, and most important, is edible.

In the process of the present invention, a collagen tube is extruded by causing a homogeneous mass of swollen collagen fibrils to flow under pressure through an annular orifice into a concentrated ammonium sulfate coagulation bath. The coagulated collagen tube is then washed with water or with a less concentrated solution of ammonium sulfate (about 2 to 18%). This prewash step reduces the amount of $(NH_4)_2SO_4$ in the extruded casing and thereby speeds up the subsequent tanning step.

The tanning bath contains alum $$[NH_4Al(SO_4)_2 \cdot 24H_2O]$$

and the pH of the tanning bath is critical. A reagent that will form a soluble stable complex with aluminum such as citric acid is also present in the tanning bath. The function of this reagent is to prevent precipitation of hydrated aluminum salts at the critical acid pH of the bath, and other reagents may be substituted for citric acid for this purpose. Since the rate of tanning is dependent upon the ionic strength of the tanning bath, the tanning bath generally contains in addition to the alum and citric acid, an amount of ammonium sulfate approximately equal to that in the prewash bath. This facilitates maintaining the composition of the tanning bath constant and consequently the rate of tanning constant.

After the tanning step, the casing is washed to remove ammonium sulfate and plasticized in a bath containing glycerine. The plasticized casing is then inflated, air-dried and heat cured for about 10 to 24 hours, at about 80° C. and about 27% relative humidity.

The concentration of ammonium sulfate in the prewash has a very marked effect on the wet strength of the casing prior to drying. The maximum strength after washing is favored by a high concentration of ammonium sulfate in the prewash, i.e., 18%. The maximum strength after alum tanning is favored by a low concentration of ammonium sulfate in the prewash, i.e., about 4%. The best balance of wet strength at the two weakest points, i.e., after prewash and after washing, may be obtained with a 4 to 10% prewash solution.

The concentration of alum in the tanning bath may vary from about 3% to about 18%, depending upon the dwell time of the extruded collagen casing in the bath. The effect of the alum concentration on the wet strength (in grams) of an extruded casing is summarized in Table I.

TABLE I

*Wet Strength (Grams) vs. Time in Tanning Solution at pH 4.3, Prewash Solution=4% $(NH_4)_2SO_4$, Gel 240, Extrusion 159*

| Time in Minutes | 6% Alum+1.4% Citric Acid | | 12% Alum+2.8% Citric Acid | | 18% Alum+4.2% Citric Acid | |
|---|---|---|---|---|---|---|
| | After Alum | After Wash | After Alum | After Wash | After Alum | After Wash |
| 5 | 332 | 174 | 326 | 208 | 476 | 258 |
| 10 | 374 | 216 | 438 | 184 | 506 | 394 |
| 15 | 420 | 252 | 452 | 266 | 522 | 406 |
| 30 | 466 | 290 | 488 | 298 | 526 | 336 |
| 60 | 568 | 296 | 552 | 306 | 604 | 432 |

In this study of the effect of alum concentration, the tanning bath contained no ammonium sulfate and the amount of citric acid is doubled and tripled in a constant ratio of 1.4% citric acid to 6% alum. Little increase in the rate of tanning or maximum wet tensile strength is observed for a 12% alum–2.8% citric acid solution. A more concentrated tanning solution (18% alum–4.2% citric acid) gives a substantial increase in both the rate of tanning and maximum wet strength, but such concentrations are unstable at room temperature and precipitate to some extent during the first 24 hours.

It is preferred that the concentration of alum in the tanning bath be about 6% and that 4 to 10% ammonium sulfate be present in the bath to help maintain the composition of the tanning bath constant.

It will be noted from FIGURE 1 which illustrates the data of Table I that the wet strength both after tanning and after washing increases very rapidly during the first 15 minutes in the tanning bath and approaches maximum strength at 30 minutes with very little further increase after 1 hour.

It may be demonstrated that a casing tanned in a solution containing 6% alum and 4% ammonium sulfate will have the highest wet strength if the tanning bath contains in addition to the alum from about 0.5% to about 1.5% citric acid. These data are summarized in Table II and plotted in FIGURE 2.

TABLE II

*Wet Strength (Grams) vs. Percent Citric Acid, Tanning Solution=6% Alum+4% $(NH_4)_2SO_4$+0.5% to 2.0% Citric Acid at pH 4.3, Gel 240, Extrusion 159*

| Percent Citric Acid | After Alum | After Wash |
|---|---|---|
| 0.5 | 154 | 146 |
| 0.75 | 320 | 256 |
| 1.0 | 344 | 263 |
| 1.5 | 384 | 292 |
| 2.0 Precipitated | 338 | 340 |
| | 334 | 198 |

The substitution of lactic acid for citric acid in the tanning bath resulted in generally lower wet strengths directly after tanning. The product tanned in the presence of lactic acid, however, maintained its wet strength after washing, whereas the wet strength of the product tanned in the presence of citric acid dropped considerably after the washing step. This is illustrated by FIGURE 3 and that data of Table III.

TABLE III

*Wet Strength (Grams) vs. Percent Lactic Acid, Tanning Solution=6% Alum+4% $(NH_4)_2SO_4$+1.0 to 4.0% Lactic Acid at pH 4.3, Gel 240, Extrusion 159*

| Percent Latic Acid | After Alum | After Wash | Percent Al in Casing |
|---|---|---|---|
| 1.0 | 278 | 292 | 0.41 |
| 1.5 | 282 | 276 | 0.54 |
| 2.0 | 258 | 268 | 0.50 |
| 3.0 | 260 | 276 | 0.52 |
| 4.0 | 206 | 242 | 0.41 |

It has been indicated above that the pH of the tanning bath is important. It has been observed that the wet strength of the extruded collagen casing will be satisfactory if the pH of the tanning bath is adjusted to the range of about 3.5 to 5.0. Optimum wet strength during processing is obtained at a pH of about 4.3. The effect of the pH of the tanning bath on the wet strength of extruded collagen casings is summarized in Tables IV and V. It will be noted from this data that the pH has a greater effect than does minor changes in the composition of the tanning bath. FIGURE 4 illustrates the data of Table IV and shows the wet strength of collagen casings after tanning at various hydrogen ion concentrations. The wet strength of these casings after the washing step is illustrated by FIGURE 5.

It has been noted that the stuffing and linking characteristics of the finished casing can be improved, with some sacrifice in the cooking response if the ammonium sulfate-citric acid-alum tanned casing is treated with formaldehyde in the plasticizing bath. A suitable plasticizing bath may contain about 6% glycerol, about 0.01% formaldehyde and about 0.1% sodium bicarbonate. The presence of formaldehyde in such small concentration also reduces the curing time from about 24 hours at 80° C. to about ½ hour at 80° C.

In order that those skilled in the art may better understand how the present invention may be carried out, the following examples are given by way of illustration and not by way of limitation. Throughout the specification and examples that follow, all quantities are expressed in parts by weight unless otherwise indicated.

washed for an equal period of time in 15% ammonium sulfate similarly adjusted to pH 6.5.

TABLE IV

*Wet In-Process Tensile Strength (Grams) vs. pH (2.0–7.0) Gel 240, Extrusion 159*

| pH | 6% Alum + 4% $(NH_4)_2SO_4$ | | | | 6% Alum + 4% $(NH_4)_2SO_4$ + 1% Citric Acid | | | | 6% Alum + 4% $(NH_4)_2SO_4$ + 1% Lactic Acid | | | |
|---|---|---|---|---|---|---|---|---|---|---|---|---|
| | After Alum | After Wash | After Plast. | Percent Al in Casing | After Alum | After Wash | After Plast. | Percent Al in Casing | After Alum | After Wash | After Plast. | Percent Al in Casing |
| 2.0 | 125 | 68 | 78 | | 104 | 66 | 58 | | 110 | 80 | 80 | |
| 3.0 | 128 | 120 | 136 | | 124 | 86 | 78 | | 118 | 90 | 86 | |
| 4.0 | 288 | 244 | 240 | .38 | 356 | 248 | 232 | .34 | 236 | 202 | 206 | .36 |
| 4.3 (control) | 230 | 230 | 220 | .42 | 460 | 292 | 288 | .59 | 278 | 268 | 276 | .54 |
| 5.0 | 138 | 100 | 122 | .15 | 242 | 170 | 164 | .45 | 216 | 228 | 226 | .38 |
| 6.0 | 125 | 114 | 116 | .20 | 162 | 134 | 150 | .44 | 154 | 224 | 230 | .15 |
| 7.0 | 132 | 92 | 98 | | 154 | 102 | 146 | | 122 | 130 | 188 | |

TABLE V

*Wet Strength (Grams) vs. pH (4.0 to 4.6), Tanning Solution=6% Alum+4% $(NH_4)_2SO_4$+1% Citric Acid, Gel 240, Extrusion 159*

| pH | After Alum | After Wash | Percent Al in Casing |
|---|---|---|---|
| 4.0 | 356 | 248 | 0.34 |
| 4.1 | 394 | 250 | 0.45 |
| 4.2 | 394 | 274 | 0.48 |
| 4.3 | 442 | 290 | 0.50 |
| 4.4 | 416 | 266 | 0.49 |
| 4.5 | 412 | 270 | 0.52 |
| 4.6 | 420 | 296 | 0.46 |

EXAMPLE I

Fresh steer hides are washed with cold water at 13° C. or less in a rotating drum for 10 to 24 hours. After washing, the hides are defleshed with a scraping machine and the hair and epidermis are cut off with a horizontal band knife. This preliminary cleaning is accomplished with standard tannery equipment.

The remaining hair and poorly cleaned sections are cut off by hand and composites are prepared from five hides. The hide composites are then cut into ½ to 4 square inch sections and reduced to pulp by three passes through a meat grinder, each pass being a finer grind. The first and second passes are through 18 and 8 millimeter holes respectively. The final grind is through holes 1.5 millimeters in diameter. It is important during the grinding process to keep the pulp below 20° C. This may be done by adding crushed ice to the hides as they are fed to the grinder.

The ground pulp is next diluted with tap water at 16° C. to give a smooth slurry containing 7.4% dry solids. This slurry (125 parts) is then trated with 125 parts of a 2.4% lactic acid solution using an inline mixer to form a homogeneous mass of swollen collagen fibrils. It is important during this acid swelling step that the temperature be maintained below about 25° C. The mixture so obtained contains 3.7% hide solids and 1.2% lactic acid. After the pulp is blended with acid, the mass of swollen collagen fibrils is further dispersed in a suitable homogenizer such as a Manton-Gaulin homogenizer (Model 125-K-5BS), fitted with a 2-stage valve and operated with a 1500 p.s.i. drop per stage.

The swollen collagen mass so obtained is filtered through a 7-mil filter screen and extruded in the form of a tube in such a way as to impart some collagen fibril orientation transverse to the extrusion direction. This may be partially accomplished by inflating the casing as it leaves the nozzle.

This extruded collagen tube of swollen collagen fibrils is coagulated for 6 minutes in an aqueous ammonium sulfate bath containing 40% ammonium sulfate adjusted to a pH of 7.0 with sodium hydroxide and is then pre-washed for an equal period of time in 15% ammonium sulfate similarly adjusted to pH 6.5.

Alum tanning of this extruded casing is accomplished by treatment with an alum solution containing 6% alum [$NH_4Al(SO_4)_2 \cdot 24H_2O$], 1% citric acid and 4% ammonium sulfate. The contact time is 6 minutes and this alum tanning solution is maintained at pH 4.3. After the tanning step, the casing is washed in tap water for 14 minutes using 2 changes of water. The casing is finally passed through a bath containing 3.6% glycerol, 20 parts per million formaldehyde and 0.1% sodium bicarbonate. The dwell time in this bath is 5 minutes. After the casing has been plasticized, it is inflated and dried for 9 minutes in a rapid stream of air at 80° C. and 8% relative humidity.

The casing is next treated with an aqueous suspension containing 15% of a commercial grade of powdered egg white and 10% glycerine. This suspension is applied to the interior of the casing at the rate of 1.4 milliliters per foot of casing treated and the casing is then inflated and dried for 9 minutes in a rapid stream of air at 80° C. and 8% relative humidity.

The albumin-treated casing has a wall thickness of 0.95 mil and a burst strength of 16 pounds per square inch. The product may be shirred, stuffed and linked without difficulty and cooked without undue shrinkage. An analysis of this casing indicates the presence of 0.41% aluminum or 6.92% alum calculated as $NH_4Al(SO_4)_2 \cdot 24H_2O$.

EXAMPLE II

A homogeneous mass of swollen collagen fibrils (4% hide solids and 0.88% lactic acid) prepared as described in Example 1 above, is filtered through a 7-mil filter screen and extruded in the form of a tube in such a way as to impart some collagen fibril orientation transverse to the direction of extrusion.

This extruded collagen tube of swollen collagen fibrils is coagulated for 6 minutes in an aqueous ammonium sulfate bath containing 40% ammonium sulfate adjusted to pH 7.0 with ammonium hydroxide and is then prewashed for an equal period of time in 15% ammonium sulfate similarly adjusted to pH 6.5.

Alum tanning of this extruded casing is accomplished by treatment with an alum solution containing 3% alum [$NH_4Al(SO_4)_2 \cdot 24H_2O$], 0.5% citric acid and 10% ammonium sulfate. The contact time is 6 minutes and the pH is maintained at 4.3. After the tanning step, the casing is washed in tap water for 14 minutes with two changes of water. The casing is finally plasticized by passing it through a bath containing 3.6% glycerol. The dwell time in this bath is 5 minutes. After the casing has been plasticized with glycerol, it is inflated and dried for 9 minutes in a rapid stream of air at 80° C. and 8% relative humidity.

Twenty-five foot lengths of the casing are treated with an aqueous suspension containing 15% of a commercial grade of powdered egg white and 10% glycerol by passing this suspension through the casing and the casing is hung up for 30 minutes at room temperature to air dry. The albumin-glycerol treated casings are then heat-cured in a forced draft oven at 72° C. and 27% relative humidity for 24 hours.

This product has a wall thickness of 0.8 mil and a burst strength of 12 pounds per square inch. This product may be shirred, stuffed and linked without difficulty and cooks satisfactorily without undue shrinkage. An analysis of this casing indicates the presence of 0.35% aluminum or 5.9% alum calculated as $NH_4Al(SO_4)_2 \cdot 24H_2O$.

EXAMPLE III

A homogeneous mass of swollen collagen fibrils (4% hide solids and 1.2 lactic acid) prepared as described in Example I above, is filtered through a 7-mil filter screen and extruded in the form of a tube. This extruded tube of swollen collagen fibrils is coagulated for 6 minutes in an aqueous ammonium sulfate bath containing 40% ammonium sulfate adjusted to pH of 7.0 with ammonium hydroxide and is then prewashed for an equal period of time in 15% ammonium sulfate similarly adjusted to pH 6.5.

Alum tanning of this extruded casing is accomplished by treatment with an alum solution containing 3% alum [$NH_4Al(SO_4)_2 \cdot 24H_2O$], 0.5% citric acid and 10% ammonium sulfate. The contact time is 6 minutes and this alum tanning solution is maintained at pH 4.3. After the tanning step, the casing is washed in tap water for 14 minutes using two changes of water. The casing is finally plasticized by passing it through a bath containing 6.0% glycerol, 5% of a commercial grade of powdered egg white and 0.3% low viscosity carboxymethyl cellulose. The carboxymethyl cellulose used has a viscosity of 25–50 cps. in 2% aqueous solution at 25° C. as determined by a Brookfield viscosimeter, and the degree of substitution is 0.75. This cellulose derivative is stated to have about one-quarter of the three available anhydro-glucose units substituted with carboxymethyl groups. The dwell time in this bath is 5 minutes. The casing is then rinsed for 1 minute, by passing it through a water bath. After the casing has been washed, it is inflated and dried at 80° C. and 8% relative humidity for 9 minutes. The dried casing is then heat-cured in a forced draft oven at 72° C. and 27% relative humidity for 24 hours.

This casing has a wall thickness of 1.0 mil and a burst strength of 22 pounds per square inch. This product stuffed and linked satisfactorily and cooked satisfactorily without excessive shrinkage.

EXAMPLE IV

A homogeneous mass of swollen collagen fibers (3.7% hide solids and 1.2% lactic acid) prepared as described in Example 1 above is filtered through a 7-mil filter screen and extruded in the form of a tube in such a way to impart some collagen fibril orientation transverse to the direction of extrusion.

The extruded collagen tube of swollen collagen fibrils is coagulated for 6 minutes in an aqueous ammonium sulfate bath containing 40% ammonium sulfate adjusted to pH 7 with ammonium hydroxide and then prewashed for 2 minutes in 4% ammonium sulfate similarly adjusted to pH 6.5.

Alum tanning of this extruded casing is accomplished by treatment with an alum solution of the composition described below in Table VI. The contact time is 5 minutes and the pH is maintained as indicated in Table VI. After the tanning step, the casing is washed for 30 minutes in tap water. The casing is next plasticized by passing it through a bath containing 6% glycerol. The dwell time in this bath is 2 minutes. After the casing has been plasticized with glycerol, it is inflated and air-dried. A sample of each casing so prepared is heat-cured in a forced draft oven at 80° C. and 27% relative humidity for 24 hours. The physical characteristics of the casings so produced are tabulated in Table VI. It will be noted that the odd numbered experiments relate to products that have not been heat-cured. The even numbered products have all been heat-cured for 24 hours at 80° C. and 27% relative humidity. The burst strengths tabulated in Table VI have been related to a wall thickness of 1 mil.

TABLE VI

| | Tanning Bath | | | pH | Wet Strength | Burst Strength | Shrink Tension | Hot Tensile Strength | Heat Cured | Aluminum Analysis as $NH_4Al(SO_4)_2 \cdot 24H_2O$ Percent |
|---|---|---|---|---|---|---|---|---|---|---|
| | Percent Alum | Percent $(NH_4)_2SO_4$ | Percent Citric Acid | | | | | | | |
| 1 | 6 | 8 | 1.4 | 3.5 | 35.0 | 15 | 0.100 | 0.044 | No | |
| 2 | 6 | 8 | 1.4 | 3.5 | 35.0 | 20 | 0.183 | 0.285 | Yes | |
| 3 | 6 | 8 | 1.4 | 4.3 | 62.5 | 17 | 0.108 | 0.064 | No | 14.34 |
| 4 | 6 | 8 | 1.4 | 4.3 | 62.5 | 17 | 0.221 | 0.293 | Yes | |
| 5 | 6 | 8 | 1.4 | 5.0 | 73.8 | 14 | 0.105 | 0.055 | No | |
| 6 | 6 | 8 | 1.4 | 5.0 | 73.8 | 18 | 0.177 | 0.153 | Yes | |
| 7 | 18 | 8 | 4.2 | 3.5 | 108.7 | 12 | 0.105 | 0.074 | No | 7.59 |
| 8 | 18 | 8 | 4.2 | 3.5 | 108.7 | 25 | 0.149 | 0.221 | Yes | |
| 9 | 18 | 8 | 4.2 | 4.3 | 431.2 | 22 | 0.113 | 0.086 | No | 14.00 |
| 10 | 18 | 8 | 4.2 | 4.3 | 431.2 | 17 | 0.192 | 0.297 | Yes | |
| 11 | 18 | 8 | 4.2 | 5.0 | 278.7 | 17 | 0.105 | 0.081 | No | 10.29 |
| 12 | 18 | 8 | 4.2 | 5.0 | 278.7 | 24 | 0.162 | 0.155 | Yes | |
| 13 | 12 | 8 | 2.8 | 3.5 | 113.7 | 22 | 0.110 | 0.046 | No | 7.08 |
| 14 | 12 | 8 | 2.8 | 3.5 | 113.7 | 22 | 0.233 | 0.308 | Yes | |
| 15 | 12 | 8 | 2.8 | 4.3 | 320.0 | 28 | 0.106 | 0.078 | No | 15.18 |
| 16 | 12 | 8 | 2.8 | 4.3 | 320.0 | 16 | 0.224 | 0.233 | Yes | |
| 17 | 12 | 8 | 2.8 | 5.0 | 263.7 | 20 | 0.105 | 0.076 | No | |
| 18 | 12 | 8 | 2.8 | 5.0 | 263.7 | 20 | 0.184 | 0.324 | Yes | |
| 19 | 6 | 4 | 1.4 | 3.5 | 222.5 | 18 | 0.107 | 0.059 | No | |
| 20 | 6 | 4 | 1.4 | 3.5 | 222.5 | 22 | 0.265 | 0.307 | Yes | |
| 21 | 6 | 4 | 1.4 | 4.3 | 220.0 | 16 | 0.111 | 0.076 | No | 17.71 |
| 22 | 6 | 4 | 1.4 | 4.3 | 220.0 | 11 | 0.249 | 0.318 | Yes | |
| 23 | 6 | 4 | 1.4 | 5.0 | 230.0 | 16 | 0.115 | 0.073 | No | |
| 24 | 6 | 4 | 1.4 | 5.0 | 230.0 | 20 | 0.269 | 0.455 | Yes | |

What is claimed is:

1. A tanned edible extruded collagen casing of uniform diameter for sausages, said casing comprising a seamless tube of collagen fibrils and being characterized by the presence of no less than 0.3% and no more than 1.1% by weight aluminum.

2. The casing of claim 1 wherein the amount of aluminum is 0.35% by weight.

3. The casing of claim 1, the burst strength of which is at least 10 pounds per square inch.

4. The casing of claim 1 in a shirred condition.

5. The casing of claim 1, the shrink tension of which is no less than 0.1 and no more than 0.3; and the hot tensile strength of which is no less than 0.15 and no more than 0.50.

6. An edible sausage that cooks satisfactorily without undue shrinkage comprising an extruded collagen casing of collagen fibrils characterized by the presence of no less than 0.3% and no more than 1.1% by weight aluminum and filled with an edible meat product.

7. The process of tanning an edible extruded collagen casing comprising collagen fibrils which includes the steps of causing said casing to contact an aqueous solution having a pH of from 3.5 to 5.0, and containing from 3% to 18% aluminum ammonium sulfate, from 1% to 4% lactic acid, and from 4% to 18% ammonium sulfate; washing the casing so obtained with water and heat-curing it.

8. The process of tanning an edible extruded collagen casing comprising collagen fibrils which includes the steps of causing said casing to contact an aqueous solution having a pH of from 3.5 to 5.0, and containing from 3% to 18% aluminum ammonium sulfate, from 0.5% to 4.2% citric acid, and from 4% to 18% ammonium sulfate; washing the casing so obtained with water and heat-curing it.

9. The process of tanning an edible extruded collagen casing comprising collagen fibrils which includes the steps of causing said casing to contact an aqueous solution having a pH of from 3.5 to 5.0, and containing 3% aluminum ammonium sulfate, ½% citric acid, and 10% ammonium sulfate; washing the casing so obtained with water and heat-curing it.

10. The process of tanning an edible extruded collagen casing comprising collagen fibrils which includes the steps of causing said casing to contact an aqueous solution having a pH of from 3.5 to 5.0, and containing 6% aluminum ammonium sulfate, 1% citric acid, and 4% ammonium sulfate; washing the casing so obtained in a 6% aqueous solution of glycerol containing 0.01% formaldehyde and 0.1% sodium bicarbonate, and heat-curing it.

11. A tanning bath for treating an edible extruded collagen casing of collagen fibrils comprising an aqueous solution of from 3% to 18% aluminum ammonium sulfate, from 0.5% to 4.2% citric acid, and from 4% to 18% ammonium sulfate, the pH of the bath being in the range of from 3.5 to 5.0.

12. A tanning bath for treating an edible extruded collagen casing of collagen fibrils comprising an aqueous solution of 3% aluminum ammonium sulfate, ½% citric acid, and 10% ammonium sulfate, the pH of the bath being 4.3.

References Cited in the file of this patent
UNITED STATES PATENTS

| | | |
|---|---|---|
| 2,485,957 | Cresswell | Oct. 25, 1949 |
| 2,988,451 | Zahn | June 13, 1961 |
| 3,071,477 | Klevens | Jan. 1, 1963 |